United States Patent [19]

Robertson et al.

[11] Patent Number: 5,038,016
[45] Date of Patent: Aug. 6, 1991

[54] LASER WELDING MONITORING SYSTEM AND METHOD

[75] Inventors: Paul A. Robertson, Duxford; John B. Lowry, Sawston, both of United Kingdom

[73] Assignee: Fiat Auto S.p.A., Turin, Italy

[21] Appl. No.: 440,166

[22] Filed: Nov. 22, 1989

[30] Foreign Application Priority Data

Nov. 22, 1988 [GB] United Kingdom ............... 8827282

[51] Int. Cl.⁵ .......................................... B23K 26/02
[52] U.S. Cl. ........................ 219/121.83; 219/121.63; 219/121.73; 219/121.76
[58] Field of Search ...................... 219/121.63, 121.64, 219/121.76, 121.78, 121.79, 121.8, 121.83

[56] References Cited

U.S. PATENT DOCUMENTS

| 4,417,127 | 11/1983 | Nachev et al. | 219/121.34 |
|---|---|---|---|
| 4,667,082 | 5/1987 | Shibata et al. | 219/121.34 |
| 4,700,045 | 10/1987 | Merry et al. | 219/121.78 |
| 4,764,655 | 8/1988 | Ortiz, Jr. et al. | 219/121.64 X |
| 4,769,523 | 9/1988 | Tanimoto et al. | 219/121.76 X |

FOREIGN PATENT DOCUMENTS 0266764 5/1988 European Pat. Off. .

Primary Examiner—C. L. Albritton
Attorney, Agent, or Firm—Sughrue, Mion, Zinn Macpeak & Seas

[57] ABSTRACT

A laser welding, monitoring system comprising a laser welding beam energy source and means for directing laser beam energy from said source and on to a concentrated laser weld spot on the workpiece to be welded shaped or cut by laser energy. A laser probe source is arranged to direct light from said probe source on to the workpiece. Laser beam detector means is arranged to pick up and monitor reflected light originating from said laser probe source and reflected back from the workpiece, wherein the light from said probe source is directed in a peripheral path encircling said concentrated laser weld spot.

4 Claims, 5 Drawing Sheets

LASER WELDING MONITORING SYSTEM AND METHOD

The present invention relates to laser welding monitoring systems, and to methods of using such systems.

The use of lasers for welding is well known and has particular advantages for automatic fabrication of car bodies and similar products. Its main advantages are that there needs to be no physical contact between the welding apparatus and the workpiece being welded, that the workpiece can be welded from one side, and that no filter is required. However a main problem is that it is difficult to control with accuracy the position of the weld when produced by a laser.

It is desirable in car manufacture that fabrication should be automated wherever possible, and this therefore requires accurate control of welding. A principal object of the present invention therefore is to provide a laser welding, such working extending also to similar operations such as shaping or cutting, heat treating, etc... system where fine control of operation can be achieved and therefore automated fabrication becomes possible.

U.S. Pat. No. 3,689,159 discloses a laser processing apparatus in which a monitoring parallel ray light beam, which can be generated by laser if desired, is directed by a mirror into the path of a laser shaping beam so that both are protected through a focussing lens on to a workpiece, and their points of focus coincide. The monitoring beam is modulated by a vibrating plate, and changes in output of the modulated light reflected from the workpiece are used to detect an out of focus condition and provide a correcting signal. This system however cannot detect whether the focussed laser spot is out of alignment with where it should be on the surface of the workpiece, i.e. it only detects misalignments up and down but not from side to side.

PCT application U.S. Ser. No. 82/01235 discloses a welding system where a laser beam is directed in a circular path around a tracking point in advance of a position at which welding takes place. This enables the location of the weld to be controlled, but does not measure operation of the weld itself, i.e. whether the weld is actually taking place where required or whether it is operating correctly. In addition because tis system uses a tracking point in advance of the welding point, a means of pivoting the tracking means relative to the weld point is required for an automated welding system then can weld in other than straight lines.

Other systems have been disclosed which make use of television for monitoring a scan of a weld path, however by their vary nature these systems pick up a large amount of redundant information and therefore are difficult to design with a satisfactorily high response rate. They are also subject to interference from light emitted by the weld itself.

The present invention overcomes these problems and enables both lateral positioning and vertical positioning of a laser weld spot to be monitored. By laser weld spot, we mean a spot where a laser beam is concentrated for the purpose of either welding or cutting or shaping of a workpiece, and the term laser welding is used broadly to encompass all of these operations.

Accordingly the invention provides a laser welding monitoring system comprising a laser beam energy source and means for directing laser beam energy from said source and on to a concentrated spot on the workpiece to be exposed to said laser energy, and a laser probe source which is arranged to direct light from said probe source on to the workpiece, and a laser beam detecting means which is arranged to pick up and monitor reflected light originating from said laser probe source and reflected from the workpiece, characterised in that means are provided to direct the light from said probe source in a peripheral path encircling said concentrated spot.

Subject to the variability of the surface of the workpiece, the peripheral path is preferably, as viewed transversely to the work surface, generally circular. This enables comparisons to be made between signals emanating from reflected probe light all round the weld position.

In the case where the system is providing a fillet weld along a predetermined path, the probe beam in encircling the weld spot will pass over the path of the position of the seam to be welded at one point and at approximately 180° on from that position will pass over a point at which the weld has already taken place. The latter point will provide a signal which can be used to monitor the completed weld, while the former point will provide a minimum signal of reflection which can then be used as a measure of the center of the weld as compared with signals on either side of these two first signals. A timing reference signal can be derived from the probe beam scanning means which determines where the position of the probe beam is on the peripheral path. Any offset from a reference signal can be used to generate a correction signal for moving the position of the weld. This enables lateral control to be effected.

Preferably the means for directing the light from said probe source in a peripheral path is arranged to direct that light so as to describe a cone. Being conical in form, means that the size of the circular path will vary in length depending on the length of the ray path. Thus a method of measuring the focus of the beam can be provided by simply measuring the diameter of the circular path described by the probe beam. Alternatively, focusing can be measured by an astigmatic focus sensing system, which effectively measures the length of the ray path in a manner known per se.

A convenient method of creating the conical probe beam is to direct the beam via a mirror which rotates about an axis which is close to but not quite at 90° to the plane of the mirror.

An embodiment of the invention will now be described by way of example with reference to the accompanying schematic drawings, in which.

Figure 1:
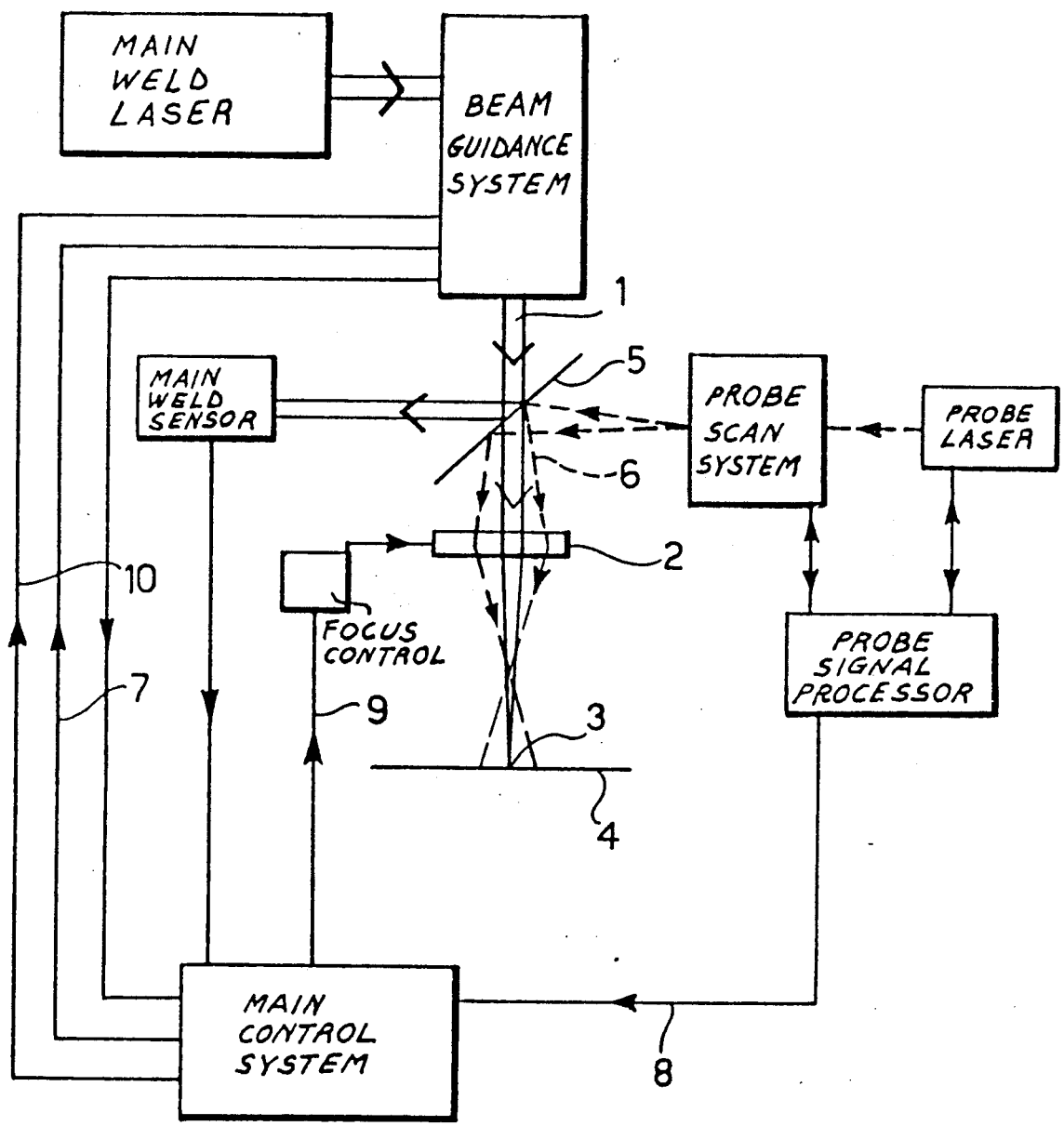
FIG. 1 is an overall schematic view of a system in accordance with the invention.

Referring to FIG. 1, an overall system comprises a main weld laser and a beam guidance system which directs a beam of laser energy 1 via a focussing system 2, typically a Zn Se lens, to a laser weld spot 3 on a workpiece 4.

For welding car body panels a $CO_2$ laser may be used, since this can provide sufficient intense power, and this will normally be guided by mirrors (for example within a robot) so that the beam energy emerges through a small nozzle (not shown in FIG. 1) located a few millimeters from the workpiece. A shielding gas, e.g. nitrogen or argon, will be blown into the welding head at a point just below the lens and this will then emerge from the nozzle, having the effect that no debris or material from the weld can get back to contaminate the lens.

All of the above is standard and well known to those in the art. What now follows is a description of the control system and that is the area within which the invention is incorporated.

A probe laser directs laser energy via a probe scan system and a beam splitter (and combiner) mirror 5 in an essentially conical beam path 6. This beam path 6 passes through the focussing lens 2 and therefore will be affected by movement of that lens or changes in its focal length due to environmental effects to an extent that can easily be related to the effect on the main weld laser beam 1.

The general operation of the system is that a main weld sensor accepts a proportion of the main laser beam 1 via beam splitter 5, and this provides an overall measure of where the weld beam 1 is directed to with respect to the focussing lens 2. This information is fed into a main control system.

Signals are also obtained by examination of the light reflected back from the beam 6 after reflection off the workpiece 4. This light is fed back up the path 6 into the probe scan system where analysis derives a control signal which is fed via path 8 into the main control system.

The main control system processes all the derived information and feeds fine control signals to the focus control for adjustment of the lens 2 via path 9 and fine tracking information to the beam guidance system via path 10. In addition the main control system can feed coarse control signals to the beam guidance system via path 7 in order to position the weld spot 3 with respect to the workpiece 4 quickly by coarsely. This could be necessary for example at the beginning of each weld and also during welding these coarse control signals will be used in conjunction with the fine control signals described earlier in order to effect larger movements that are beyond the range of the focus control system.

Figure 2:
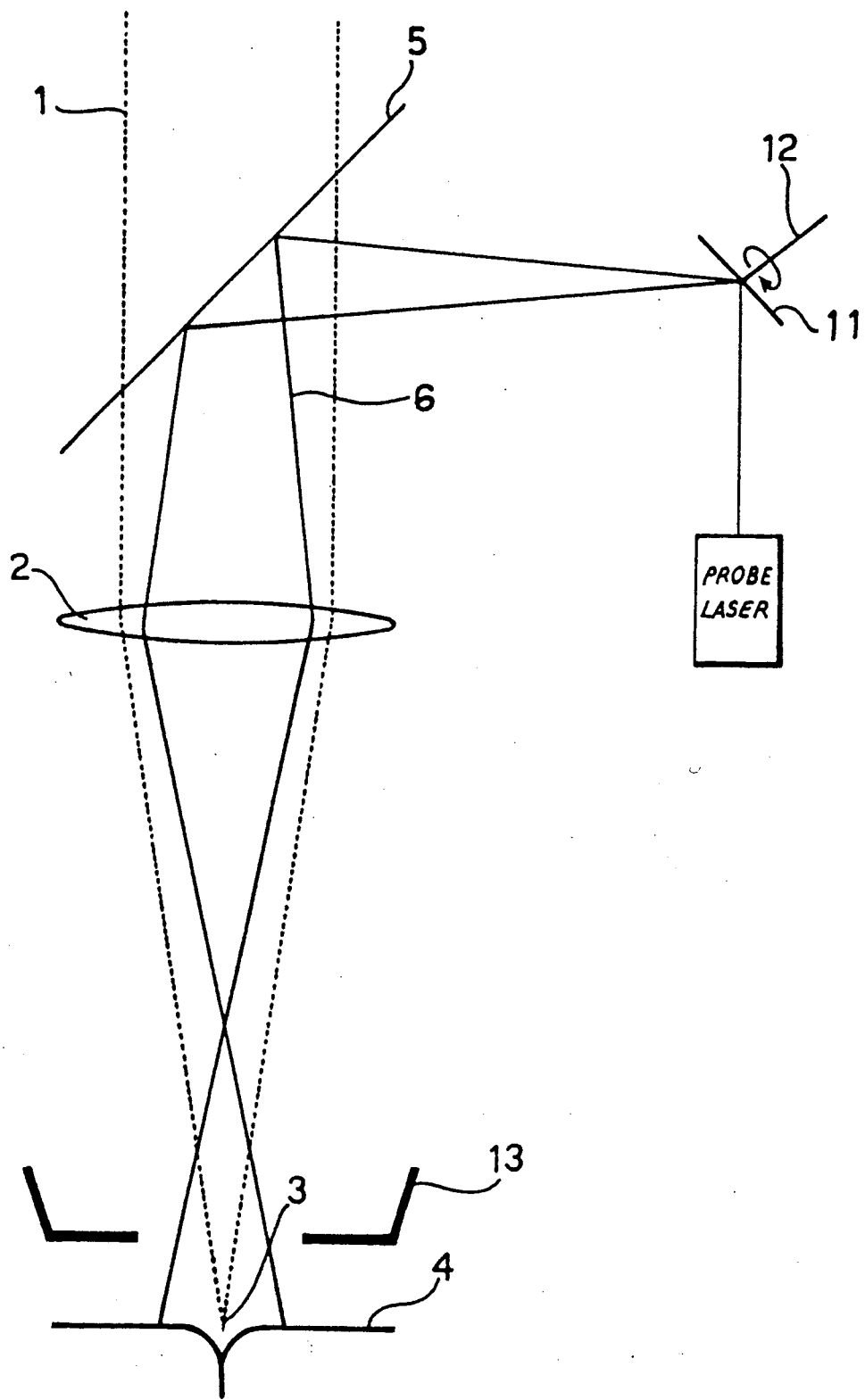
FIG. 2 shows the optical arrangement of the laser and probe.

Referring now to FIG. 2, this shows that probe beam system in greater detail.

The probe beam laser directs energy to a rotating mirror 11. The mirror rotates about an axis 12 which is nearly but not quite at right angles to the mirror, e.g. 88° and this results in a conical beam being produced. The actual angle can be selected in practice in dependence on the configuration of the system, but the nearer the angle is to 90° the shallower is the angle of the conical beam so produced.

The beam passes through the focussing lens 2 and thence through the outlet aperture of nozzle 13 to focus on the workpiece 4 and describe a peripheral path encircling the concentrated laser weld spot 3.

The nozzle aperture size is conveniently about 8 mm and is spaced 3 to 4 mm from the workpiece. Therefore the projected circle from the probe beam conveniently has a diameter of about 6 to 8 mm so as to provide optimum performance without shielding or interference from the nozzle. The angle of the rotating mirror is chosen to achieve this result.

Figure 3:
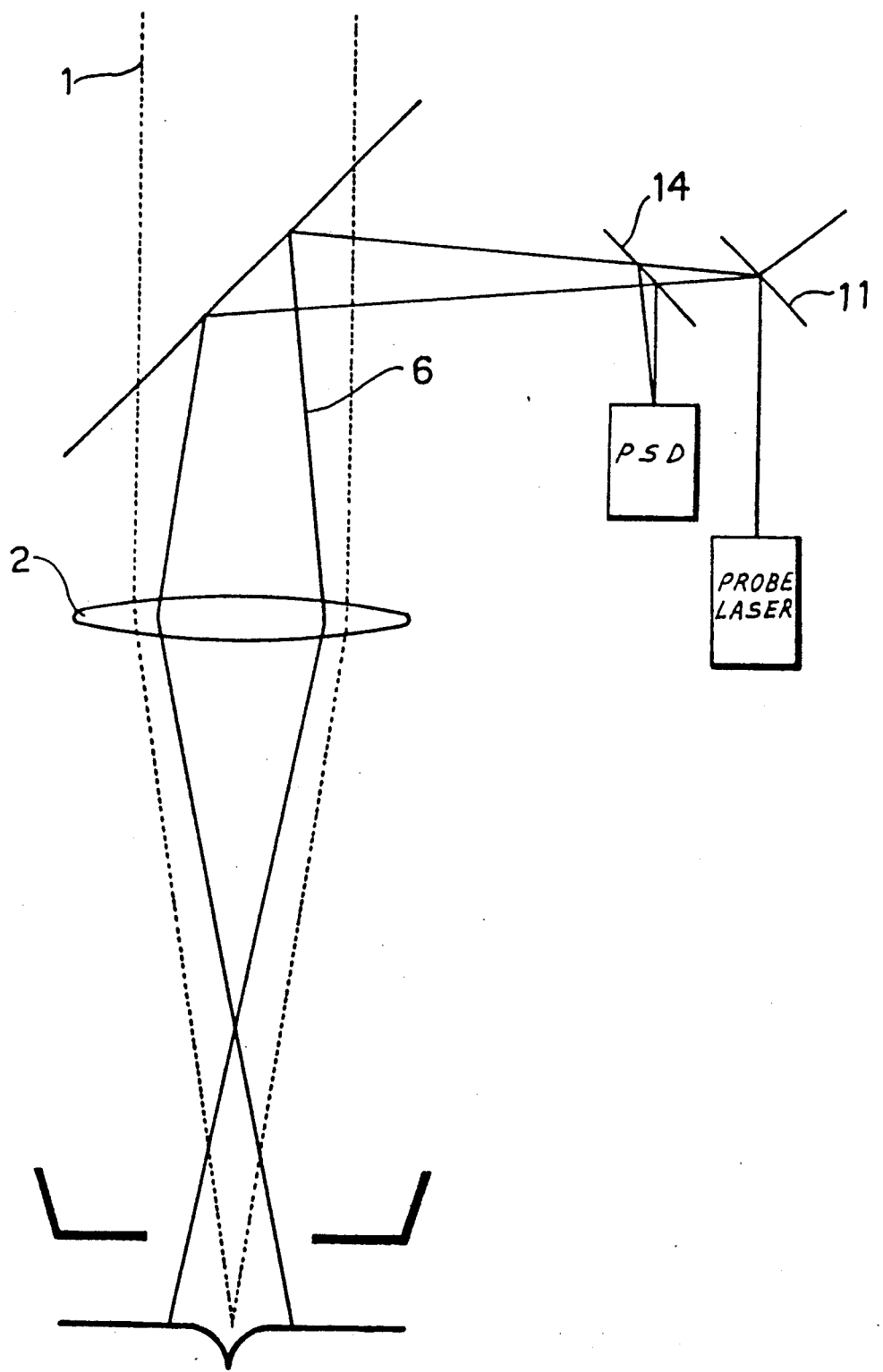
FIG. 3 shows one form of detection system.
Figure 4:
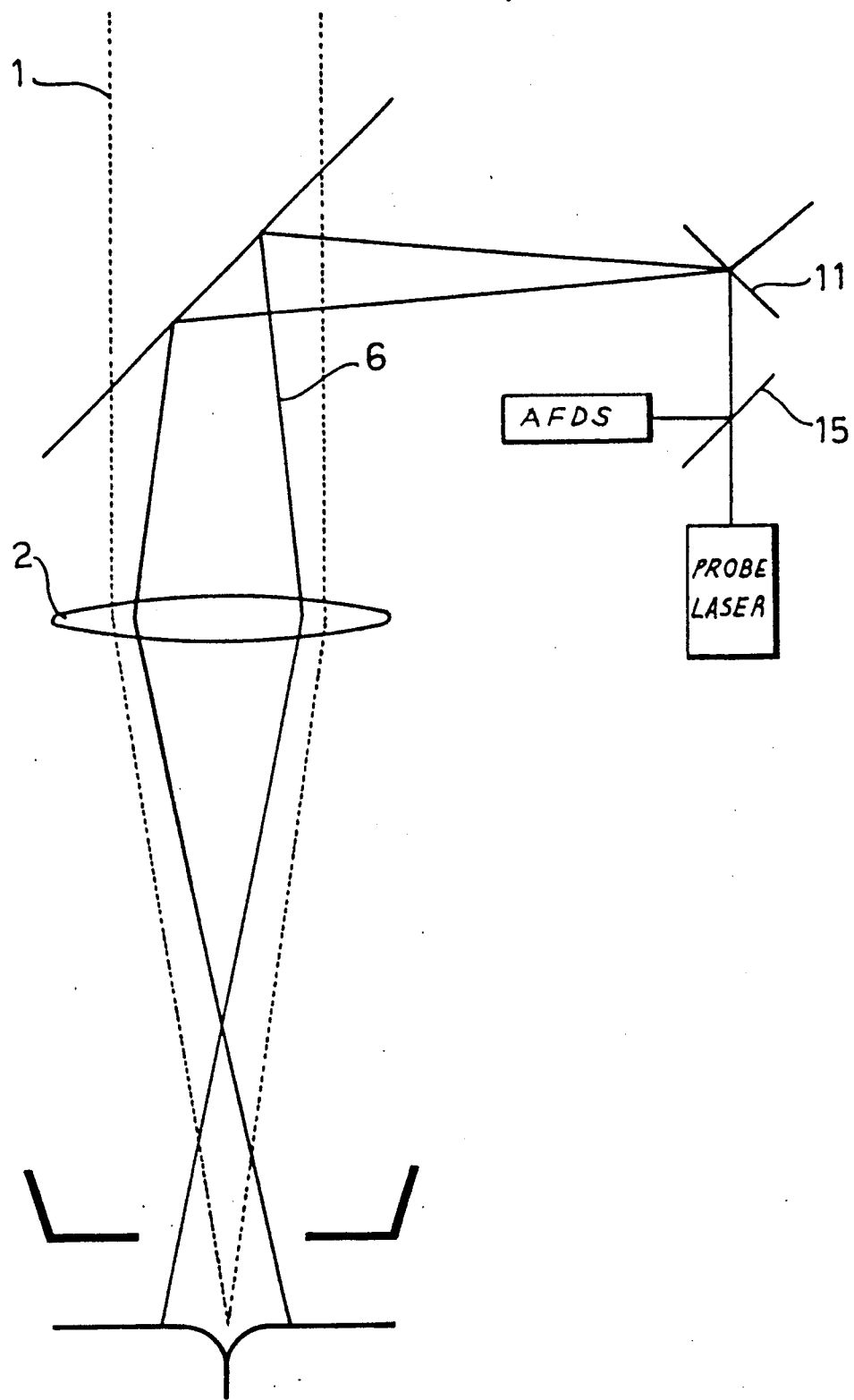
FIG. 4 shows a second form of detection system.

FIG. 3 and 4 show two different configurations of systems which collect the reflected beam radiation.

In the first case, as shown in FIG. 3, a beam splitter 14 is disposed in the returning ray path prior to the position of the rotating mirror 11.

The returning radiation is then directed on to a position sensitive detector (PSD). With the mirror in this position, the detector will see an image of the circle transcribed by the beam. The image of the center of the circle can be blocked off to prevent radiation from the weld spot reaching the detector directly.

The PSD is a device having a large photosensitive area, so that the beam will be placed up at all times. Focus can be measured by measuring the diameter of the reflected circle of light, i.e. the diameter of the circle varies with the height of the cone and hence beam length. This is achieved by sensing the weighted average of the light intensity as it tracks a full circle; while tracking information is obtained by looking at the light intensity at different moments on its path round the circle.

In the alternative system shown in FIG. 4, a beam splitter mirror 15 is located after the reflected path has passed back off the rotating mirror 11. This brings the reflected light back to a single point (rather than a circle) and so its varying intensity can be monitored more critically. A further advantage is that extraneous radiation e.g. from the weld itself can more easily be prevented from being picked up by the detector and a clearer response can be achieved.

In this second example, focus is measured by use of an astigmatic focus detection system (AFDS) of a type well known in the art (e.g. for measuring focus of a laser pick up in a compact disc player).

In both of the above examples shown in FIG. 3 and 4, extraneous light can be prevented from reaching the optical system by using a narrow band optical filter whose transmission wavelength matches the wavelength of the probe laser. In addition the probe laser beam can be amplitude modulated and a lock-in amplifier detection system used to further reject extraneous signals, especially those deriving from radiation emitted by the weld spot which will usually have a strong low frequency content. It is a feature of the invention that such a technique can easily be implemented.

Operation of a weld and how lateral positioning of the weld can be detected will now be described with references to FIGS. 5, 6 and 7 for the specific example of a fillet weld.

Figure 5:
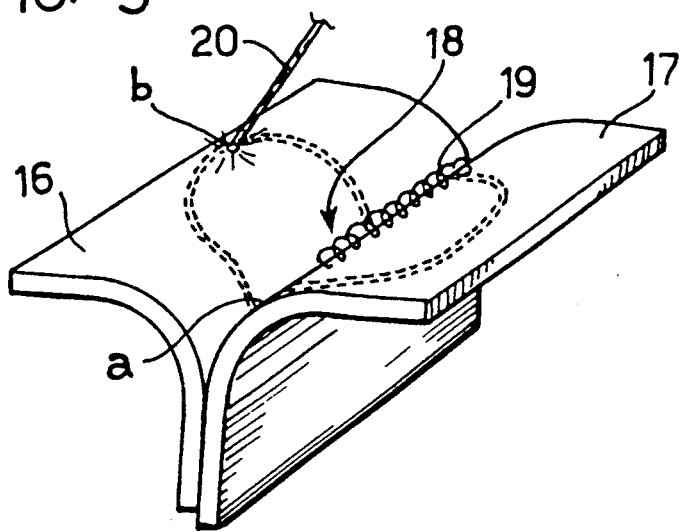
FIG. 5 is a perspective view of a fillet weld workpiece.

Referring to FIG. 5, two sheets of metal 16 and 17 need to have a fillet weld 18 applied to the fillet line between the two sheets.

The weld spot will, when correctly located, be at a central point 18 between the two sheets, and as welding progresses by relative movement between the workpiece (the two sheets) and the welding apparatus a path 19 of welded material will be produced along the fillet. The probe beam 20 transcribes a peripheral path encircling the central point of the active weld spot 18 and reflects its radiation back dependent on the surface it is passing at any movement in time. Reflection will be at a minimum when passing the fillet in the unwelded state, a, and at a maximum when passing flat metal as at the position, b, and d, as shown in the FIG.

Figure 6:
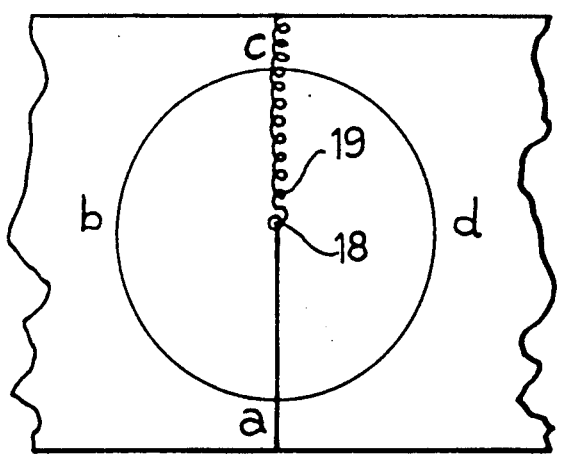
FIG. 6 is a plan view of the arrangement of FIG. 5.
Figure 7:
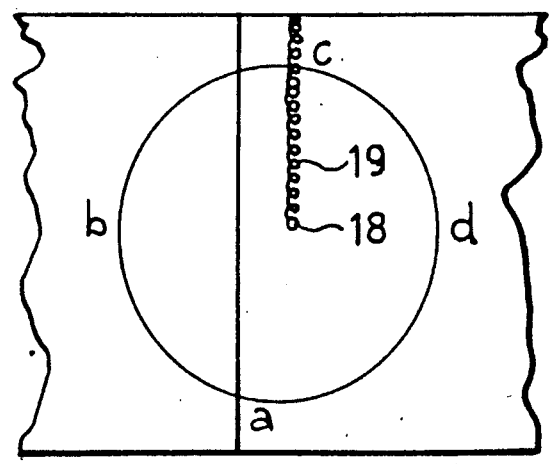
FIG. 7 is a plan view showing misalignment.

FIG. 6 depicts the same example in plan view, and the four conditions can be seen which are a, minimum reflection
b, maximum reflection c, a minimum and some reflection from the weld itself
d, maximum reflection In the state when the weld is correctly located at the center of the fillet, these four conditions will occur as output in a symmetrical timed relationship as the circle is scanned.

If however the weld is disposed at a point away from the center of the circle, the four conditions will no longer be symmetrical in timing and therefore a correction signal can be generated to put matters right. FIG. 7 shows in exaggerated form the condition where the weld line is missing the desired fillet path, and the timing of the four conditions changes.

In addition if the AFDS configuration in FIG. 4 is used, the signal derived from this will also change as the probe beam passes over points a and c in FIG. 6. This information can be used in the place of or in conjunction with the signals derived from changes in reflection described above.

What is claimed is:

1. A laser welding, monitoring system comprising a laser beam energy source and means for directing laser beam energy from said source and on to a concentrated spot on a workpiece to be exposed to said laser energy, and a laser probe source which is arranged to direct light from said probe source on to the workpiece, and a laser beam detecting means which is arranged to pick up and monitor reflected light originating from said laser probe source and reflected back from the workpiece, wherein means are provided to direct the light from said probe source in a peripheral path transcribing the surface of a cone and encircling said concentrated spot.

2. A system according to claim 1, wherein said peripheral path is circular.

3. A system according to claim 1 comprising a rotating mirror arranged to rotate about an axis at an angle near to 90° to its surface to create the conical path of light.

4. A system according to claim 1, comprising means for measuring the diameter of the circle transcribed by said probe beam in order to determine focus.

* * * * *